(12) United States Patent
Fukuda et al.

(10) Patent No.: US 6,394,768 B1
(45) Date of Patent: May 28, 2002

(54) DC BRUSHLESS FAN

(75) Inventors: Yoshiaki Fukuda, Akashi; Takamasa Yamaguchi, Tottori-ken, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/475,229

(22) Filed: Dec. 30, 1999

(30) Foreign Application Priority Data

Jan. 7, 1999 (JP) ............................................. 11-001722

(51) Int. Cl.[7] .......................... F04B 17/00; F04B 35/04; H02K 11/00; H01R 12/00; H05K 1/00

(52) U.S. Cl. .......................... 417/423.15; 417/423.14; 417/423.7; 417/354; 361/945; 310/71; 439/83; 439/84

(58) Field of Search ................. 417/423.14, 423.15, 417/423.7, 354, 423.8, 366; 361/697, 695, 694; 310/67 R, 71, 89; 439/83, 84

(56) References Cited

U.S. PATENT DOCUMENTS

| | | | | |
|---|---|---|---|---|
| 3,180,267 A | * | 4/1965 | Bemmann et al. | 417/423.7 |
| 3,644,066 A | * | 2/1972 | Heob et al. | 417/354 |
| 4,164,690 A | * | 8/1979 | Muller et al. | 310/69 |
| 4,800,307 A | * | 1/1989 | Papst | 310/67 R |
| 4,885,488 A | * | 12/1989 | Cox | 417/423.7 |
| 5,176,509 A | * | 1/1993 | Schmider et al. | 417/423.7 |
| 5,189,327 A | * | 2/1993 | Ootsuka et al. | 310/71 |
| 5,267,842 A | * | 12/1993 | Harmsen et al. | 417/354 |
| 5,559,674 A | * | 9/1996 | Katsui | 361/697 |
| 5,979,541 A | * | 11/1999 | Saito | 417/423.7 |
| 5,988,995 A | * | 11/1999 | Hong | 417/423.14 |
| 5,997,267 A | * | 12/1999 | Lee | 417/423.7 |
| 6,241,007 B1 | * | 6/2001 | Kitahara et al. | 361/695 |
| 6,274,955 B1 | * | 8/2001 | Satoh et al. | 310/71 |

* cited by examiner

Primary Examiner—Charles G. Freay
Assistant Examiner—Timothy P. Solak
(74) Attorney, Agent, or Firm—Parkhurst & Wendel, L.L.P.

(57) ABSTRACT

A DC brushless fan is reflow-soldered to a substrate, efficiently and densely mounted on the substrate, and the fan and its coupling section are provided with a high impact resistance, thereby providing a small and reliable piece of equipment having a high productivity. The DC brushless fan includes a housing having a bottom surface, a side surface, and a top surface. The bottom surface is located adjacent and opposite to a substrate of a piece of equipment, and provided on the bottom surface side are a plurality of lands for being mechanically or electrically soldered to the substrate of the equipment. A stator, a bearing device, and a rotor are provided inside the housing. The stator has a stator core and a coil wound around the stator cone, and the rotor has a magnet and is supported by the bearing device. The fan further includes a fan blade rotating with the rotor.

9 Claims, 5 Drawing Sheets

DC BRUSHLESS FAN

FIELD OF THE INVENTION

The present invention relates to a small DC brushless fan.

BACKGROUND OF THE INVENTION

An information related equipment (hereafter referred to as "equipment") is desired to have a high performance, a small size, and a high density. In order to meet such requirements, equipment manufacturers are attempting to build smaller electronic components of a higher performance into the equipment and to produce wiring substrates that are multilayered so as to densely integrate the electronic components thereinto and that have a high productivity with high density, temperature rise due to heat from the electronic components becomes greater.

A blowing fan is normally used-to cool the equipment, but local cooling of substrates is more and more frequently carried out due to the increasing need to efficiently cool the equipment with a low power consumption. Such a local cooling fan is disclosed, form example, in Japanese Utility Model Laid-Open No. 62-195356. This application provides a box-shaped axial fan having screws located in corresponding corners thereof and comprised of motor feeding terminals so that the electric connection of the fan can be completed by simply fixing the fan to a printed circuit board by using machine screws. However, many conventional blowing fans, including the above example, depend on the concept that the fan is mounted on a rear surface of an enclosure of the equipment, and do not have an optimal form for locally cooling substrates.

In view of these backgrounds, the requirements of fans for locally cooling substrates will be listed below. First, the fan must be able to be located close to electronic components that tend to be very hot. To achieve this, the fan is desirably very small enough to be mounted adjacent to electronic components. In addition, the fan must be consistent with improvement of the degree of integration of the equipment on the substrate. Thus, it can desirably be mounted by using the surface mount technology similarly to other solid electronic components. This is because the degree of integration of a multilayer substrate decreases when holes are formed in the substrate so that terminals can be passed therethrough. In addition, for an improved degree of integration, the fan desirably has such a form as to be mounted close to adjacent electronic components to achieve a high density.

Secondly, to increase the productivity of the equipment, the fan must be compatible with the same mounting process as other solid electronic components. To meet this requirement, the fan desirably has a form suitable for the reflow soldering method. The fan also desirably has such a form as to be efficiently mounted using the same assembly machine as other solid electronic components.

Thirdly, the fan must be compatible with the portable use of the equipment. To achieve this, the fan desirably has a high impact resistance.

It is an object of the present invention to meet the above requirements. That is, a first object is to contribute to improving the degree of integration of the equipment. To attain this object, the fan must be small enough to be mounted adjacent to electronic components, must be able to be mounted on the substrate of the equipment using the SMT technology, and must have such a form as to be mounted close to adjacent electronic components to achieve a high density.

A second object is to contribute to improving the productivity of the equipment. Thus, the fan must have a form suitable for the reflow soldering method and must have such a form as to be efficiently mounted using an assembly machine.

A third object is to accommodate the portable use of the equipment. To meet this object, the fan must have a sufficient impact resistance.

A general object of the present invention is to attain the above objects to provide equipment that has a smaller size, a lower weight, a higher productivity, and a higher added value.

DISCLOSURE OF THE INVENTION

To attain this object, a DC brushless fan according to the present invention is comprised of: a housing comprising a bottom surface, a side surface, anda top surface, the bottom surface being located adjacent and opposite to a substrate of an equipment; pairs of terminals provided on an outer side of the bottom surface and having a function of being mechanically or electrically soldered to the substrate of the equipment, wherein there are provided a stator, a bearing device, and a rotor inside the housing, the rotor being supported by the bearing device and opposed to the stator, the fan further comprising a blowing fan rotating with the rotor.

Next, the structure of the DC brushless fan according to the present invention will be described in detail.

First, a DC brushless fan according to a first mode of the present invention is configured so as to meet the following requirements:

(a) The DC brushless fan has a housing comprising a bottom surface, a side surface, and a top surface.

(b) The bottom surface is located adjacent and opposite to a substrate of an equipment, and pairs of terminals are provided on the outer side of the bottom surface and having a function of being mechanically or electrically soldered to the substrate of the equipment.

(c) A stator, a bearing device, and a rotor are provided inside the housing.

(d) The rotor is supported by the bearing device and opposed to the stator, and the fan includes a blowing fan rotating with the rotor.

Such terminals serve to reduce the size of the fan and enable the fan to be joined (soldered) with a top surface of the substrate of the equipment by using the reflow method. The housing also allows the DC brushless fan to be handled easily. When the terminals on the bottom surface side are formed so as not to project from the side surface beyond the bottom surface area, the fan can be placed close to adjacent electronic components. In addition, the terminals can be further projected in a vertical direction from the bottom surface so as to engage with holes in the substrate of the equipment. Essentially, however, the form in which the terminals are surface-connected to a surface of the substrate is desirable in improving the mounting density of the equipment.

A DC brushless fan according to a second mode of the present invention is configured so as to meet the following requirements:

(a) The DC brushless fan has a housing comprising a bottom surface, a side surface, and a top surface.

(b) The bottom surface is located adjacent and opposite to a substrate of an equipment, and pairs of terminals project from the side surface at generally the same height as the bottom surface and have a function of being mechanically or electrically soldered to the substrate of the equipment.

(c) A stator, a bearing device, and a rotor are provided inside the housing.

(d) The rotor is supported by the bearing device and opposed to the stator, and the fan includes a blowing fan rotating with the rotor.

Since the terminals project from the side surface, these terminals can be added to the terminals arranged in the bottom surface area to further increase the number of terminals, thereby increasing the binding strength. This form can accommodate the reflow method for locally heating the projecting terminals.

A DC brushless fan according to a third mode of the present invention is configured so as to meet the following requirements:

(a) The DC brushless fan has a housing comprising a bottom surface, a side surface, and a top surface, and the housing includes a chuck section.

(b) The bottom surface is located adjacent and opposite to a substrate of an equipment, and pairs of terminals are provided on the bottom or side surface side and having a function of being mechanically or electrically soldered to the substrate of the equipment.

(c) A stator, a bearing device, and a rotor are provided inside the housing.

(d) The rotor is supported by the bearing device and opposed to the stator, and the fan includes a blowing fan rotating with the rotor.

Such a housing enables the fan to be transferred using a transfer and load chuck of an electronic automatic assembly machine, thereby enabling the fan to be automatically loaded on and soldered to the substrate of the equipment. The chuck section desirably accommodates a suction chuck, a gripping chuck, or a magnet chuck, as shown below.

In addition, according to the DC brushless fan of the present invention, the chuck section is a suction surface of the fan, that is, the top surface thereof to which the suction chuck can be opposed. Such a suction surface enables the fan to accommodate a suction chuck, which is most often used for electronic components assembly machines. When the suction surface that is the top surface is a flat surface having a diameter of 3 mm or more, desirably 4 mm or more, the fan is compatible with most automatic assembly machines. The suction surface may be shaped like a ring. Either an inclined surface or a spherical surface can be chucked.

In addition, according to the DC brushless fan of the present invention, the chuck section is two parallel planes extending generally perpendicularly to the bottom surface or two parallel ridges located on the side surface and extending parallel with the bottom surface. These two parallel planes on the side surfaces allow the use of electronic components assembly machine for gripping, transferring, and aligning the DC brushless fan and checking the alignment. The fan can also be aligned by using a gripping chuck to clamp it at the two parallel ridges extending parallel with the bottom surface.

In addition, according to the DC brushless fan of the present invention, the chuck section is the top surface comprised of a ferromagnetic member. Such a ferromagnetic member in the top surface enables the fan to be transferred using an electronic components assembly machine with a magnet chuck. Preferably, the ferromagnetic member is, for example, a plated steel plate or a magnetic stainless steel plate.

Further, according to the DC brushless fan of the present invention, marking or direction determination means is provided on the top or side surface and adapted for enabling a mounting direction of the fan to be determined. Such a marking, which enables the mounting direction to be determined, enables the fan to be transferred and loaded by using an automatic assembly machine. In this place, the marking may have an optical reflectance different from that of its peripheral area, may exhibit a magnetic reaction different from that of the peripheral area, or may be projected or recessed relative to the peripheral area. One of these methods is selected depending on the structure or size of the DC brushless fan or the configuration of an equipment assembly facility. The direction determination means is obtained by forming a part of the housing into a shape different from that of the remaining part.

In addition, according to the DC brushless fan of the present invention, the number of terminals located on the bottom surface is larger than the number of poles required for electric connections. Thus, since many terminals including those required for electric connections are provided on the outer side of the bottom surface, the mounting strength of the DC brushless fan on the substrate is increased to improve the impact resistance. The basic concept is that in any DC brushless fan, the terminals must have a firm mechanical junction function for supporting principal weights. The terminals maybe formed of lands, plates, lines, or headed pins. The bottom surface needs not be a bottom-surface-side front surface and must only be formed substantially of a bottom-surface-side end surface of a side wall.

Furthermore, according to the DC brushless fan of the present invention, the pairs of terminals are arranged on the bottom surface on both sides of a line passing through the centroid or the center of gravity of the bottom surface. In this manner, the terminals are arranged so as not to be biased toward one portion of the bottom surface, so that the terminals cooperate to effectively support an impact, thereby providing a large holding force. Desirably, the terminals are arranged point-symmetrically, line-symmetrically, or rotation-symmetrically relative to the centroid or the center of gravity of the bottom surface in order to share an impact more evenly. More specifically, the center of gravity is a point at which the center of gravity of the entire fan is projected vertically onto the bottom surface.

BRIEF DESCRIPTION OF THE DRAWINGS

FIG. 2b is a side view of FIG. 2a;

DESCRIPTION OF THE EMBODIMENTS (Embodiment 1)

Figure 1A:
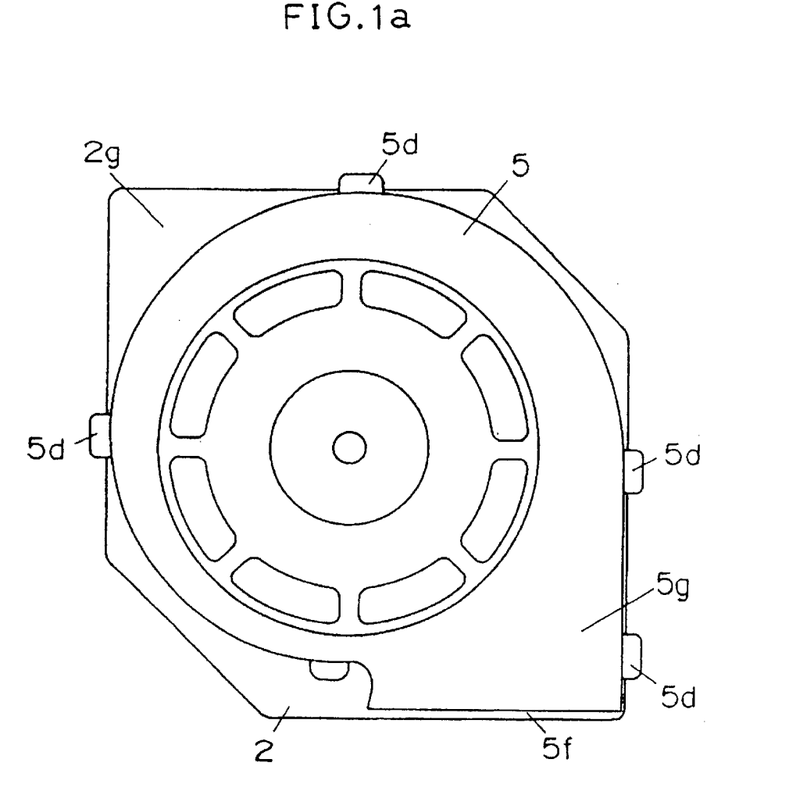
FIG. 1a is a top view of a DC brushless fan according to an embodiment of the present invention.
Figure 1B:
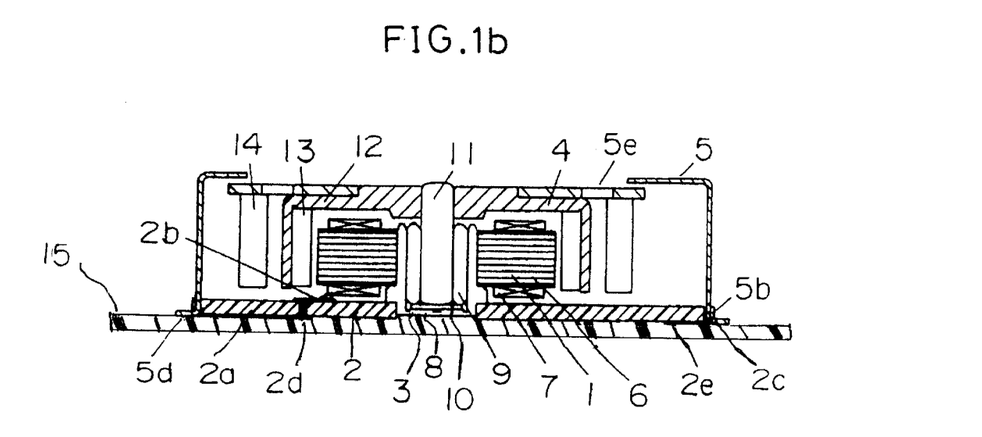
FIG. 1b is a side sectional view of the fan.
Figure 2A:
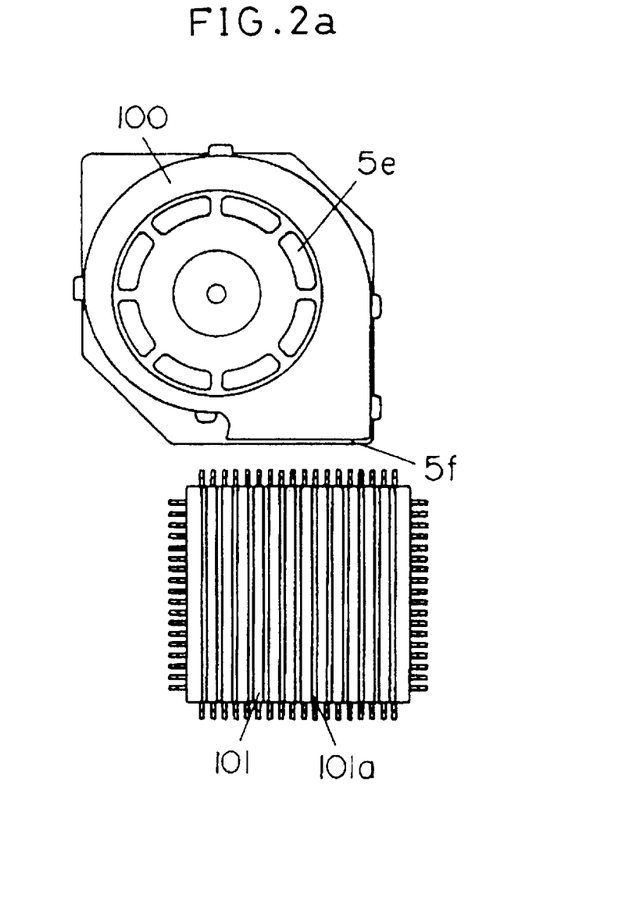
FIG. 2a is a top view showing the DC brushless fan arranged adjacent to an electronic component.
Figure 2B:
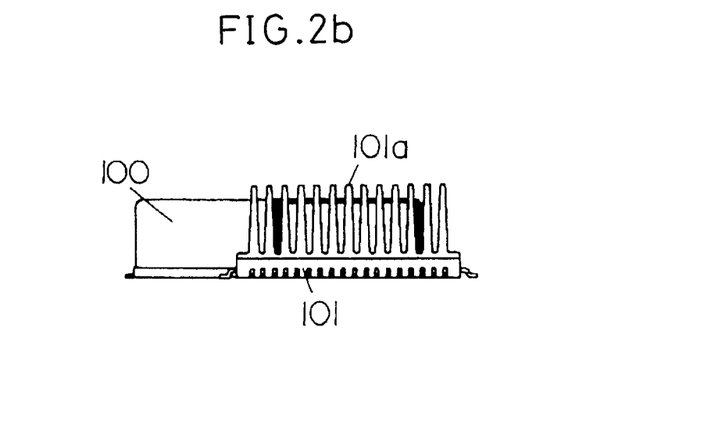

FIG. 1a is a top view of a DC brushless fan according to a first embodiment of the present invention. FIG. 1b is a side sectional view of this fan. FIG. 2a is a top view of the DC brushless fan mounted on a substrate of an equipment at a location adjacent to an integrated circuit (an electronic component). FIG. 2b is a side view of FIG. 2a.

In FIG. 1, the DC brushless fan comprises a stator 1, a printed circuit board 2, a bearing device 3, a rotor 4, and a cover 5. The cover 5 principally forms a top surface and side surfaces and a printed circuit board 2 forms part of the top and side surfaces and a bottom surface.

The stator 1 is formed by covering a surface of a stator core 6 with an insulating film and winding a coil 7 around the surface. The printed circuit board 2 comprises a double-faced through-hole substrate. The printed circuit board has a bottom surface, a stator mounting surface opposed to the bottom surface, and outer peripheral side surfaces.

The printed circuit board 2 has lands 2a, 2e on its bottom surface. It also has a land 2b on the stator mounting surface side. In addition, a solderable metal surface 2c is formed on the outer peripheral side surface side. The metal surface 2c is formed simultaneously with a through-hole 2d.

The bearing device 2 and the stator 1 are coaxially bound to the stator mounting surface of the printed circuit board 2. A terminal of the coil 7 on the stator core 6 is soldered to the land 2b on the stator mounting surface side. The land 2b is electrically connected to the land 2a on the bottom surface side via a through-hole 2d. Lands 2a and 2e are configured to attach to a substrate 15, as shown in FIG. 1b.

The bearing device 3 comprises a bottomed housing 8, an oil-impregnated metal 9, a thrust pad 10, and a shaft 11 inserted into the thrust pad 10 and having one end bound to the rotor 4 in its central portion. The rotor 4 has a rotor yoke 12 and a magnet 13 fixed thereto, and the shaft 11 bound to the rotor yoke 12 in its central portion. The rotor yoke 12 surrounds the periphery of the stator 1 and is rotatively supported by the bearing device 3.

The cover 5 is a light shell shaped generally like a spiral having a top surface, side surfaces, and an end portion that is a tip of the side surfaces, the shell comprising a thin metal. The cover 5 covers the rotor 4 and has its end portion abutting on the stator mounting surface of the printed circuit board at a location near an outer peripheral end of the mounting surface. As shown in FIG. 1b, the cover 5 further has a projecting portion 5b formed at its end portion and solder-fixed to the opposed metal surface 2c of the printed circuit board 2.

And, the rotor yoke 12 further has a fan blade 14 attached thereto at a location in its outer periphery for taking air from an intake hole 5e in the top surface of the cover 5 and blowing it out from an exhaust hole 5f.

The DC brushless fan configured as described above is mounted on a substrate (15) of an equipment at a location adjacent to an integrated circuit 101 as shown in FIG. 2. The integrated circuit 101 has a radiating fin 101a mounted thereon. Although not shown, the substrate has other electronic components integrated and mounted thereon. The DC brushless fan 100 is reflow-soldered to the lands of the substrate of the equipment via the lands (in FIG. 1b, 2a, 2e) on its bottom surface. The equipment has a motor drive circuit (not shown) on its substrate for exciting and controlling the stator 1 via the terminal (the land 2a). The magnet 13 is driven to rotate the rotor 4. The fan blade 14 attached to the rotor 4 then rotates, and air is blown out from the exhaust hole 5f in the cover to cool the radiating fin 101a of the integrated circuit 101.

In this manner, the DC brushless fan according to this embodiment has the pairs of terminals (the lands 2a, 2e) arranged on its bottom surface side and separated by an insulating portion. Since the DC brushless fan has a terminal structure that enables the fan to be solder-connected to the substrate of the equipment by placing the terminals on the substrate and then heating the terminals, it is compatible with the SMT mounting method and can be soldered by using the reflow method. The location of the external connection terminals on the bottom surface eliminates the need to arrange the terminals and the motor portion in parallel to enable the size of the fan to be reduced. If the terminals on the bottom surface portion are formed so as not to project from the side surface side beyond the bottom surface area, the fan can be densely mounted with adjacent electronic components at a small interval from the adjacent electronics. In addition, the terminals can further be projected from the bottom surface in a vertical direction so as to engage with holes in the substrate of the equipment so that a strong binding force can be obtained by soldering the terminals in the holes. Basically, however, it is desirable for the equipment to be able to obtain a sufficient binding force simply by surface-connecting the fan to a surface. of the substrate of the equipment, and the present invention is chiefly intended to meet this requirement.

The DC brushless fan according to the present invention has projecting portion 5d provided on the side surface side and further projecting outward. The projecting terminals 5d are formed by further extending the projecting portion 5b of the cover 5. As seen in FIG. 1b, the projecting terminals 5d are generally flush with the lands 2a, 2e. When the DC brushless fan is placed on the substrate of the equipment and reflow-soldered, the DC brushless fan is bound thereto via the large number of terminals to obtain a higher holding strength.

Furthermore, although not shown, a mechanism can also be so contemplated that there is used only the projecting terminal both for a mechanical junction function and for an electric connection function. The projecting terminal can be joined with the substrate by using the reflow method that selectively heats the terminal while not heating the DC brushless fan body. This method can reduce an increase in temperature inside the DC brushless fan, so despite the presence of a component of the DC brushless fan having a low heat resistance, reflow soldering can be carried out without destroying any DC brushless fan.

In addition, the DC brushless fan according to this embodiment has the stator core 6 and the coil 7 wound around the stator core 6, and the rotor 4 has the magnet 13 and is supported by the bearing device 3 to rotatively surround the periphery of the stator 1. That is, the DC brushless fan uses a cored outer rotor structure. This structure has a higher magnetic-circuit permeance than a coreless structure so as to use a smaller magnet than the latter structure to obtain the same output. Consequently, the weight of the rotor can be reduced to reduce loads on the bearing device while improving the impact resistance.

In this manner, the structure in which the bottom surface of the DC brushless fan and the substrate of the equipment are solder-joined together provides a high impact resistance by enabling the use of many techniques such as the technique for firmly supporting the DC brushless fan, the lighter rotor, the lighter outer cover (the cover and the printed circuit board), and the simple structure.

In addition, the DC brushless fan according to this embodiment has suction surfaces formed on its top surface at two locations so that suction chucks (air chucks) can be placed thereon in such a manner as to be opposed to each other. That is, the suction surfaces correspond to a portion 2g of the top surface of the printed circuit board 2 and a portion 5g of the top surface of the cover located at a position near an exhaust hole. This structure enables the DC brushless fan to be sucked and chucked. Since the air chuck is a chuck method that does not interfere with adjacent electronic components, the interval between the DC brushless fan and the adjacent electronic components can be reduced. Consequently, the DC brushless fan can be efficiently and densely mounted on the substrate of the equipment. Incidentally, the air chucks are flexible enough to chuck a surface that is not completely flat.

In addition, the printed circuit 2 is almost square, and its side surfaces comprise two parallel planes that extend almost perpendicularly to the bottom surface. Directional alignment is enabled by gripping and chucking these planes from corresponding opposite sides of the fan. Accordingly, this structure allows easy alignment and checks for alignment and improves the accuracy for the mounting position and orientation. Therefore, the DC brushless fan can be high-densely mounted on the substrate of the equipment.

In addition, according to the DC brushless fan of this embodiment, the material of the top surface portion (that is, the cover 5) is preferably a ferromagnetic substance (such as a steel plate). Chuck means can be used that corresponds to a magnetic chuck instead of an air chuck or a gripping chuck.

In addition, according to the DC brushless fan of this embodiment, the cover 5 is not rotation-symmetrically shaped and thus configures direction determination means. This configuration accommodates mounting direction control for automatic transfer and loading. Even if the DC brushless fan has been incorrectly orientated before packaging or delivery, the direction can be correctly established during mounting. Therefore, the fan can be efficiently mounted on the substrate of the equipment in such a way as to provide a high quality.

Instead of this direction determination means, a marking may be provided. When the marking has a projecting or recessed shape relative to its periphery, it can be formed simultaneously with the member forming the top surface or the side surfaces (according to this embodiment, the cover) using a mold that is used to produce this member. This marking has the advantage of accommodating all of visual checks, magnetic reactions, and height sensors. A method using an object that shows a magnetic reaction different from that of the periphery, for example, a magnetic ink may also be used.

The present DC brushless fan has such an effective transfer and loading chuck section to enable the fan to be accurately aligned and mounted in the correct orientation. These functions of the outer cover enable the fan to be efficiently mounted on the substrate of the equipment similarly to other solid electronic components and also enables it to be densely arranged close to the electronic components.

(Embodiment 2)

Figure 3A:
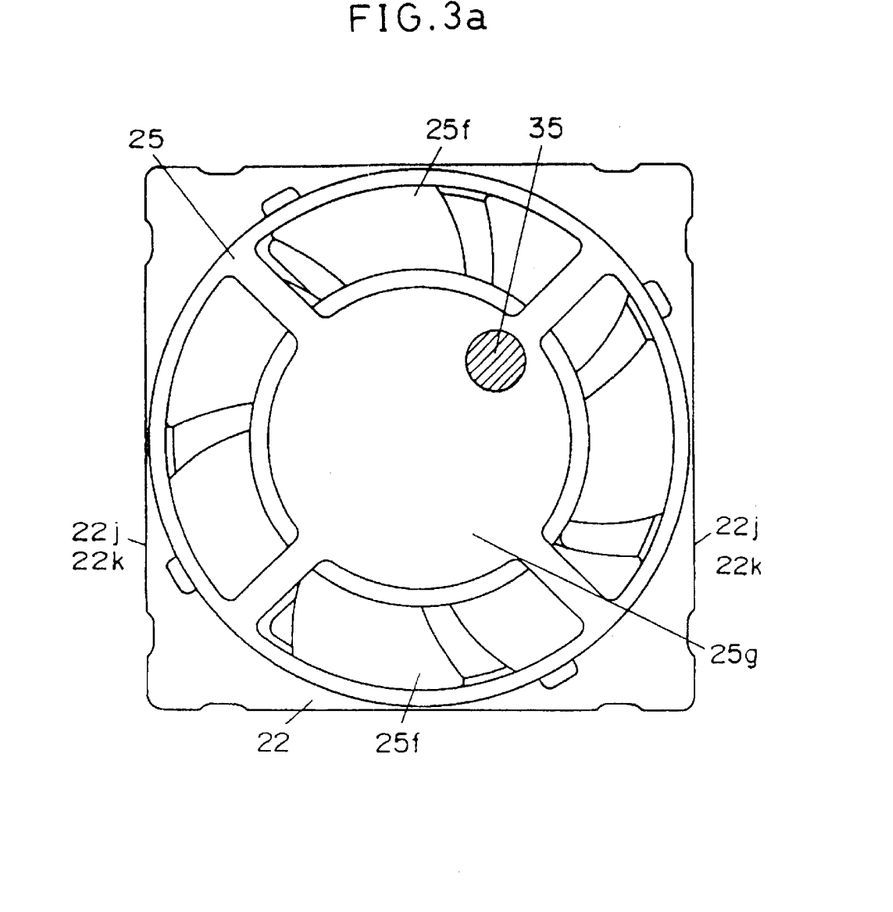
FIG. 3a is a top view of a DC brushless fan according to another embodiment of the present invention.
Figure 3B:
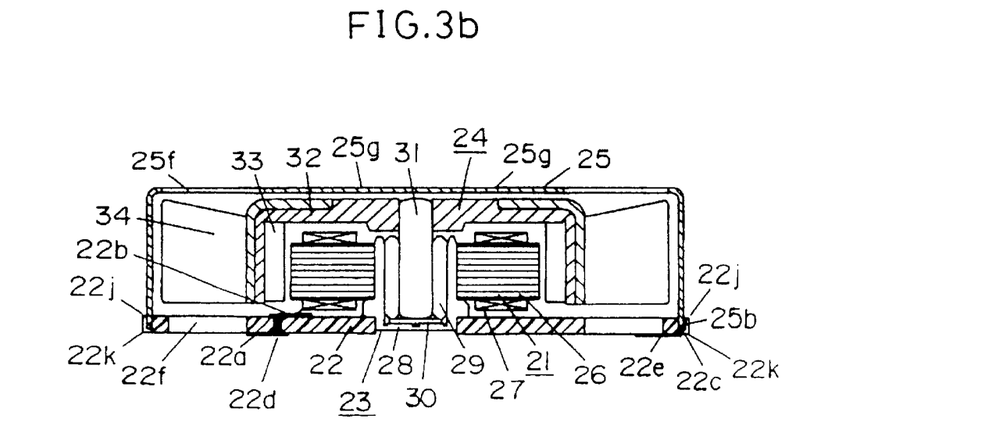
FIG. 3b is a side sectional view of the fan.
Figure 4:
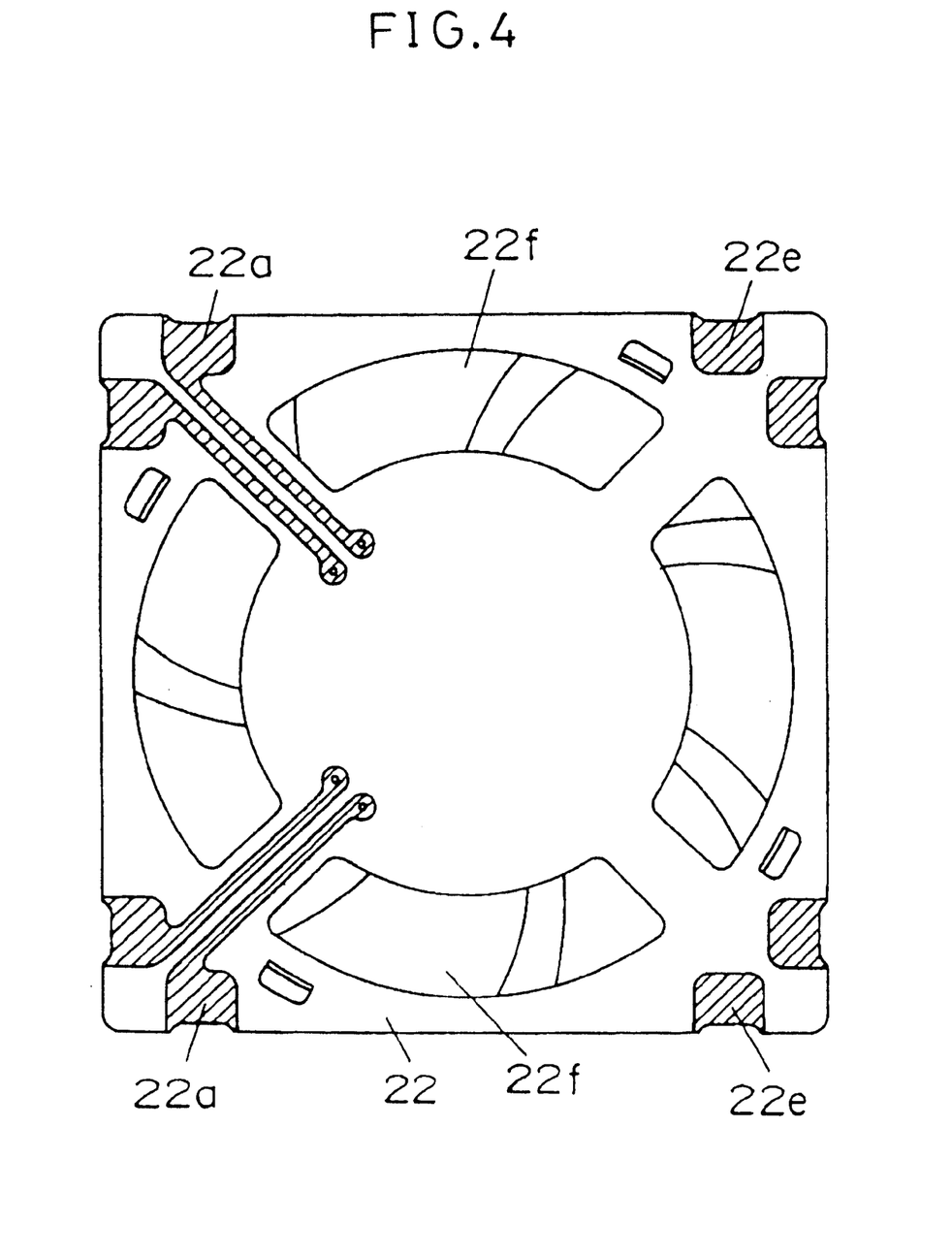
FIG. 4 is a bottom view of the fan.

FIG. 3a is a top view of another DC brushless fan according to the present invention. FIG. 3b is a side sectional view of this fan. FIG. 4 is a bottom view of this fan. The description of those portions that are similar to the corresponding ones in Embodiment 1 is omitted, and different points are chiefly described.

A cover 25 is a light shell that is shaped almost like a cylinder having a top surface, side surfaces, and an end portion that is a tip of the side surfaces, the shell comprising a thin metal. The cover 25 covers the rotor 24 and has its end portion abutting on the stator mounting surface of the printed circuit board 22 at a location near an outer peripheral end of the mounting surface. The cover 25 further has a projecting portion 25b formed at its end portion and solder-fixed to an opposed metal surface 22c of the printed circuit board 22.

Furthermore, a fan blade 34 is attached thereto a rotor yolk 32 at a location in its outer periphery for taking air from an intake hole 22f in the printed circuit board 22 and blowing air out from an exhaust hole 25f in the cover 25.

According to the DC brushless fan of this embodiment, the cover has a suction surface 25g formed on its top surface in a central portion thereof and to which a suction chuck (an air chuck) can be opposed. This structure enables the DC brushless fan to be sucked and chucked.

In addition, according to the DC brushless fan of this embodiment, the printed circuit 22 is almost square, and its side surfaces comprise two parallel planes that extend almost perpendicularly to the bottom surface. The fan can be transferred and loaded by gripping and chucking these portions from corresponding opposite sides of the fan. Two contours are located on the side surface and extend parallel with the bottom surface and with each other and include a contour 22j and a contour 22k as shown in FIGS. 3a and 3b. Pressing this portion in a fashion sandwiching it using a gripping chuck allows alignment. In this case, however, the bottom or top surface must be supported.

In addition, according to the DC brushless fan of this embodiment, the cover has a marking 35 for determining the direction. This structure accommodates mounting direction control for automatic transfer and loading. Even if the DC brushless fan has been incorrectly orientated before packaging or delivery, the direction can be correctly established during mounting.

In addition, the DC brushless fan according to this example has a terminal (a land 22e) provided on the bottom surface side and which is not involved in electric connections. Although eight lands 22a, 22e are formed on the bottom surface as shown in FIG. 4, only four (lands 22a) of them are involved in electric connections. The large number of lands serve to increase the coupling area between the substrate of the equipment and the DC brushless fan to allow firm coupling. This structure can improve the impact resistance required if the equipment is dropped. Furthermore, since each land is connected to a through-hole surface on the outer peripheral side surface of the printed circuit board, it can be checked from the side surfaces whether the fan has been correctly solder-connected to the equipment.

In addition, according to the DC brushless fan of this embodiment, the plurality of lands 22a, 22e on the bottom surface are arranged on each of the corresponding opposite sides of a line passing through the centroid of the bottom surface. Specifically, the lands are point-symmetrically arranged. In most cases, the centroid of the bottom surface aligns generally with the position of the center of gravity of the DC brushless fan, but the symmetrical arrangement of the terminals enables the position of a force obtained by synthesizing the holding force of each terminal to align with the position of the center of gravity. That is, an impact force can be evenly distributed to each terminal to maximize the impact resistance required if the equipment is dropped.

An axial fan such as the one shown in the above embodiment may be placed on electronic components that tend to be hot. In this case, the printed substrate 22 preferably has terminals provided on its bottom surface side at locations higher than the electronic components.

(Embodiment 3)

Figure 5A:
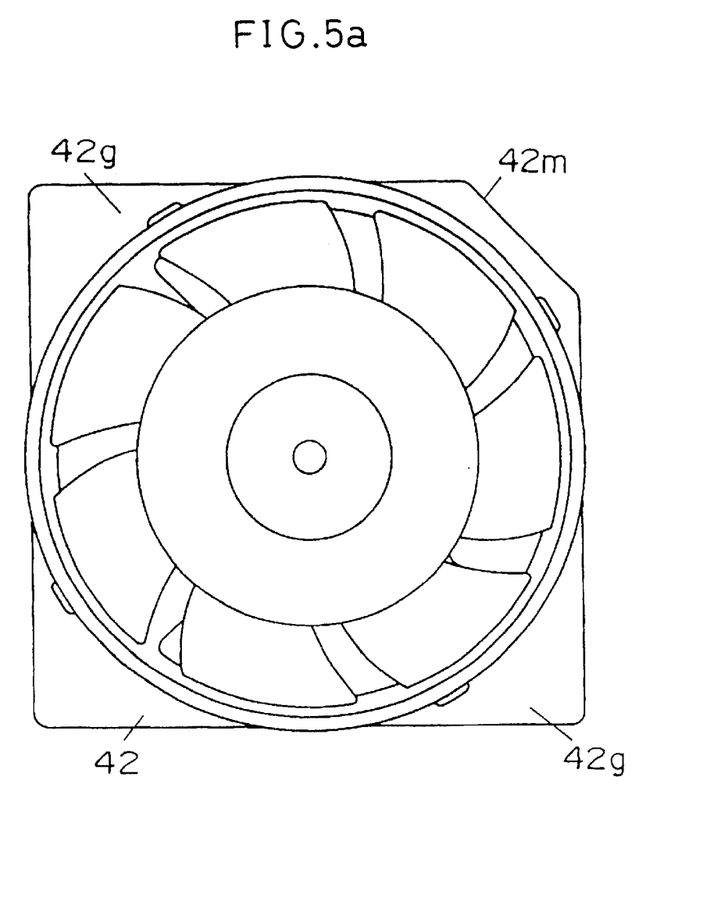
FIG. 5a is a top view of a DC brushless fan according to yet another embodiment of the present invention.
Figure 5B:
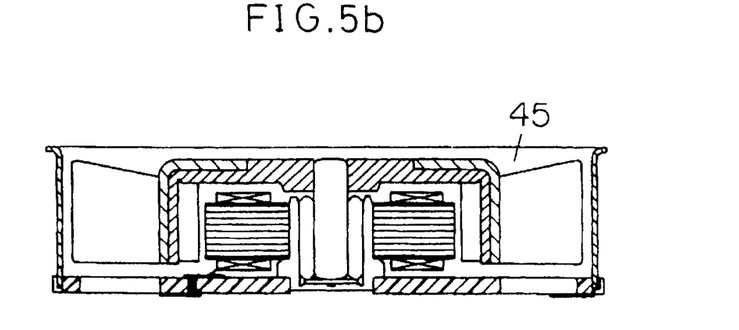
FIG. 5b is a side sectional view of the fan.

FIG. 5a is a top view of another DC brushless fan according to the present invention. FIG. 5b is a side sectional view of this fan.

This DC brushless fan is similar to Embodiment 2 except for the shapes of the cover and the printed circuit board. In FIGS. 5a and 5b, a cover 45 has a narrow top surface and has no suction surface in a central portion of the top surface. Thus in this case, part (two portions) of a top surface of a printed circuit board 42 is formed as a suction surface 42g, while another portion 42m is cut out to constitute direction determination means.

Although several embodiments have been described above, the present invention is not limited to the above described embodiments but various applications or expansions thereof are possible without deviating from the spirits of the present invention. Although each of the embodiments has been described in conjunction with mounting of the motor drive circuit on the substrate of the equipment, of course the circuit may be mounted on the substrate of the fan.

As apparent from the above explanation,
(a) the DC brushless fan according to the present invention has a terminal structure that enables the fan to be solder-connected to the substrate of the equipment by placing the fan on the substrate and then heating the fan. Thus, this DC brushless fan is compatible with the SMT mounting method and preferable for the reflow soldering method. In addition, the DC brushless fan can be efficiently mounted on the substrate of the equipment because:
(b) the fan has a shape that can be easily handled;
(c) the fan can be mounted on the substrate using a chuck;
(d) the orientation of the fan can be definitely established during mounting. In addition, the fan can be high-densely mounted on the substrate of the equipment because;
(e) the fan occupies a smaller area of the substrate of the equipment; and
(f) the fan allows the interval between the fan and adjacent electronic components to be reduced. Furthermore, the fan can be provided with a high impact resistance because:
(g) the fan can be firmly coupled to the substrate of the equipment;
(h) the fan enables an impact force to be evenly distributed to each terminal; and
(i) the fan allows the weight of the rotor to be reduced.

Therefore, an equipment including the DC brushless fan according to the present invention has a smaller size, a lower weight, a higher productivity, and a higher added value than in the prior art.

What is claimed is:

1. A DC brushless fan comprising:
   a housing configured for attachment to a substrate of an equipment, the housing comprising a bottom outer surface, a side surface, and a top surface, said bottom outer surface arranged to be located adjacent the substrate;
   at least one pair of terminals provided on the bottom outer surface, said at least one pair of terminals for mounting the housing to the substrate of the equipment and connected electrically to a stator by one of a surface mount method and a solder reflow method;
   a bearing device;
   a rotor inside the housing, said rotor being supported by said bearing device and opposed to said stator; and
   a blowing fan for rotating with said rotor.

2. The DC brushless fan according to claim 1, wherein the number of terminals located on the bottom surface side is larger than the number of poles required for electric connections.

3. The DC brushless fan according claim 1, wherein the pairs of terminals are arranged on the bottom surface on both sides with respect to a line passing through the centroid or the center of gravity of the bottom surface.

4. A DC brushless fan comprising:
   a housing configured for attachment to a substrate of an equipment, the housing comprising a bottom surface, a side surface, and a top surface, said bottom surface arranged to be located adjacent the substrate;
   at least one pair of terminals projecting from said side surface at generally the same height as the bottom surface, said at least one of pair of terminals for mounting the housing to the substrate of the equipment and connected electrically to a stator by one of a surface mount method and a solder reflow method;
   a bearing device;
   a rotor inside the housing, said rotor being supported by said bearing device and opposed to said stator; and
   a blowing fan for rotating with said rotor.

5. A DC brushless fan comprising:
   a housing configured for attachment to a substrate of an equipment, the housing comprising a chucking section, a bottom surface, a side surface, and a top surface, said bottom surface arranged to be located adjacent the substrate;
   at least one pair of terminals provided on the outer side of one of said bottom and side surface, said at least one of pair of terminals for mounting the housing to the substrate of the equipment and connected electrically to a stator by one of a surface mount method and a solder reflow method;
   a bearing device;
   a rotor inside the housing, said rotor being supported by said bearing device and opposed to said stator; and
   a blowing fan for rotating with said rotor.

6. The DC brushless fan according to claim 5, wherein the chucking section comprises a suction surface which is located on the top surface and to which a suction chuck can be opposed.

7. The DC brushless fan according to claim 5, wherein the chucking section comprises two parallel planes located on the side surface and extending approximately perpendicularly to one of the bottom surface and two parallel ridges located on the side surface and extending parallel with the bottom surface.

8. The DC brushless fan according to claim 5, wherein the chucking section comprises a ferromagnetic member forming the top surface.

9. The DC brushless fan according to claim 5, further comprising a marking or direction determination means provided on one of a top or side surface and adapted for enabling a mounting direction of the fan to be determined.

* * * * *